(12) United States Patent  
Kraft (10) Patent No.: US 8,783,710 B1
(45) Date of Patent: Jul. 22, 2014

(54) WHEELBARROW LEVELING SYSTEM (71) Applicant: Dennis B. Kraft, Hill City, SD (US)

(72) Inventor: Dennis B. Kraft, Hill City, SD (US)

( * ) Notice: Subject to any disclaimer, the term of this patent is extended or adjusted under 35 U.S.C. 154(b) by 0 days.

(21) Appl. No.: 13/747,526

(22) Filed: Jan. 23, 2013

(51) Int. Cl.
*B62B 1/20* (2006.01)
*B62B 1/00* (2006.01)

(52) U.S. Cl.
CPC .................................... *B62B 1/008* (2013.01)
USPC ....................... 280/653; 280/47.31; 280/47.33

(58) Field of Classification Search
USPC .............. 280/47.31, 43.1, 47.26, 47.23, 6.15, 280/6.154, 6.155, 6.156, 651, 652, 653, 280/654, 659, 47.33
See application file for complete search history.

(56) References Cited

U.S. PATENT DOCUMENTS

| | | |
|---|---|---|
| 2,293,188 A | 8/1942 | Brice |
| 5,149,116 A | 9/1992 | Donze |
| 5,924,708 A | 7/1999 | Bisaillon |
| 6,869,098 B2 * | 3/2005 | Tomchak et al. ............. 280/653 |
| 7,134,676 B2 | 11/2006 | Capers, Jr. |
| 7,147,234 B2 | 12/2006 | Davis |
| 7,354,059 B2 * | 4/2008 | Black .......................... 280/653 |
| 8,474,855 B2 * | 7/2013 | Kilen ........................... 280/653 |
| 2004/0227314 A1 | 11/2004 | Black, Jr. |
| 2006/0170197 A1 | 8/2006 | Capers, Jr. |

\* cited by examiner

*Primary Examiner* — John Walters
(74) *Attorney, Agent, or Firm* — Jason L. Gilbert

(57) ABSTRACT

A wheelbarrow leveling system for easily leveling a wheelbarrow on uneven and sloped ground surfaces. The wheelbarrow leveling system generally includes an outer leg having an outer leg mount adapted to be secured to a wheelbarrow. An inner leg is slidably positioned within the outer leg such that it may be extended and/or retracted within the outer leg to different heights. A trigger is provided which, upon being engaged or disengaged, will cause a locking member to engage with or disengage with one of a plurality of apertures positioned on the inner leg, thus allowing the overall height of the present invention to be easily adjusted to level a wheelbarrow.

18 Claims, 7 Drawing Sheets

WHEELBARROW LEVELING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a leveling wheelbarrow leg and more specifically it relates to a wheelbarrow leveling system for easily leveling a wheelbarrow on uneven and sloped ground surfaces.

2. Description of the Related Art

Any discussion of the related art throughout the specification should in no way be considered as an admission that such related art is widely known or forms part of common general knowledge in the field.

Wheelbarrows are used to convey various materials around a work area, such as a construction site or a home project. Due to the nature of wheelbarrows, they are often prone to tip over on uneven ground. Tipping over can result in injury or loss of valuable time in completing a project. The materials stored within the wheelbarrow may be spilled and, depending on the individual, it may be exceedingly difficult to right the wheelbarrow after such an event.

Because of the inherent problems with the related art, there is a need for a new and improved wheelbarrow leveling system for easily leveling a wheelbarrow on uneven and sloped ground surfaces.

BRIEF SUMMARY OF THE INVENTION

The invention generally relates to a wheelbarrow leveling leg which includes an outer leg having an outer leg mount adapted to be secured to a wheelbarrow. An inner leg is slidably positioned within the outer leg such that it may be extended and/or retracted within the outer leg to different heights. A trigger is provided which, upon being engaged or disengaged, will cause a locking member to engage with or disengage with one of a plurality of apertures positioned on the inner leg, thus allowing the overall height of the present invention to be easily adjusted to level a wheelbarrow.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7 illustrate a wheelbarrow leveling system 10, which comprises an outer leg 20 having an outer leg mount 25 adapted to be secured to a wheelbarrow 12. An inner leg 30 is slidably positioned within the outer leg 25 such that it may be extended and/or retracted within the outer leg 30 to different heights. A trigger 50 is provided which, upon being engaged or disengaged, will cause a locking member 40 to engage with or disengage with one of a plurality of apertures 39 positioned on the inner leg 30, thus allowing the overall height of the present invention to be easily adjusted to level a wheelbarrow 12.

B. Outer Leg

Figure 1:
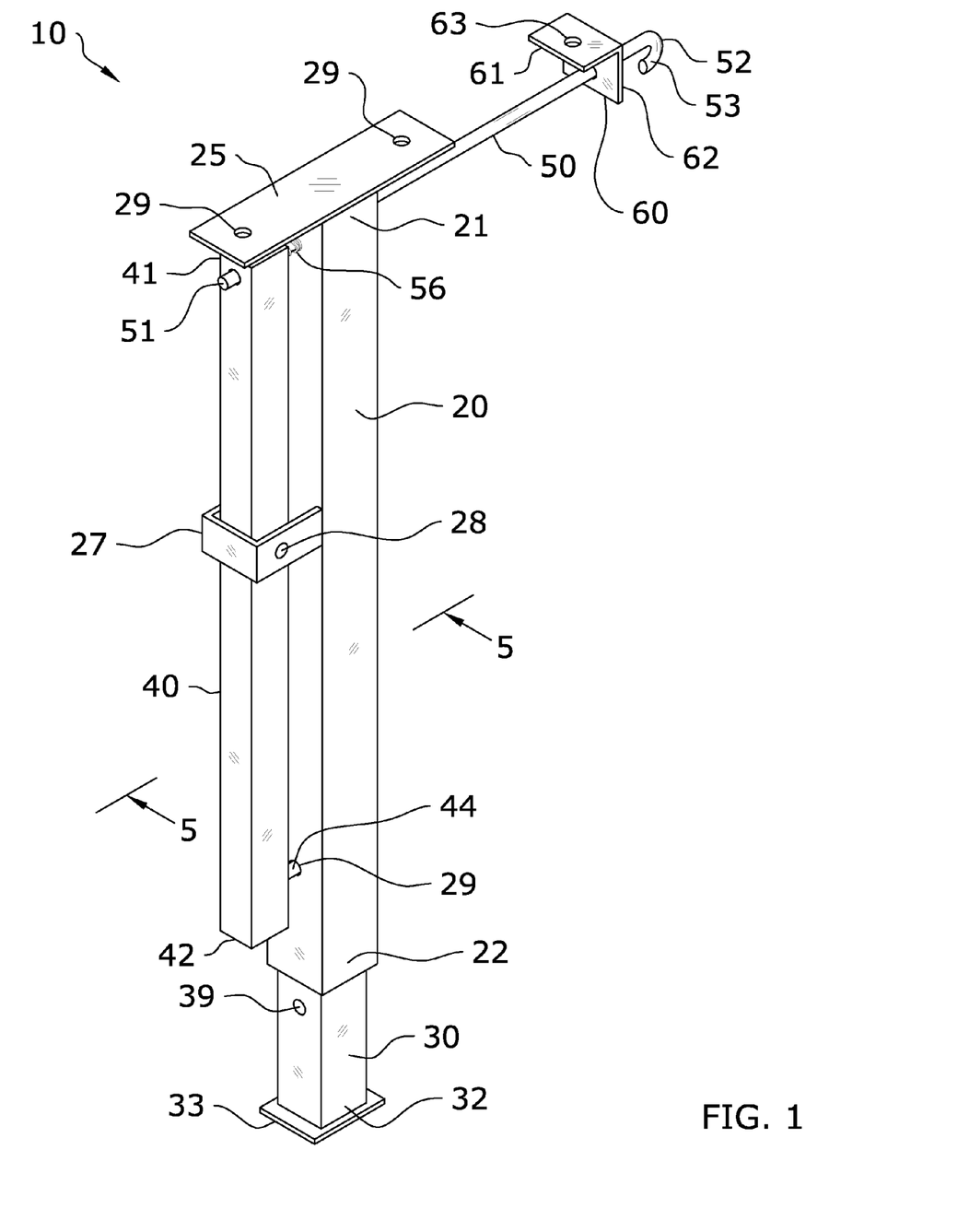
FIG. 1 is an upper perspective view of the present invention.

As shown in FIG. 1, the present invention includes an outer leg 20 which is secured to a wheelbarrow 12 or other mobile structure via an outer leg mount 25. The outer leg 20 acts to house the inner leg 30 both in its extended and retracted positions.

The outer leg 20 is generally comprised of hollow, elongated member having an upper end 21, a lower end 22 and an inner channel 24 extending from the upper end 21 to the lower end 22. The lower end 22 of the outer leg 20 includes a lower opening 23 through which the inner leg 30 is slidably positioned within the inner channel 24.

While the figures illustrate the outer leg 20 as being comprised of a square-shaped cross-section, it is appreciated that other shapes and configurations may be utilized for the present invention. By way of example and without limitation, the outer leg 20 could be cylindrically-shaped or any other shape which allows the inner leg 30 to slide freely therein.

Figure 3:
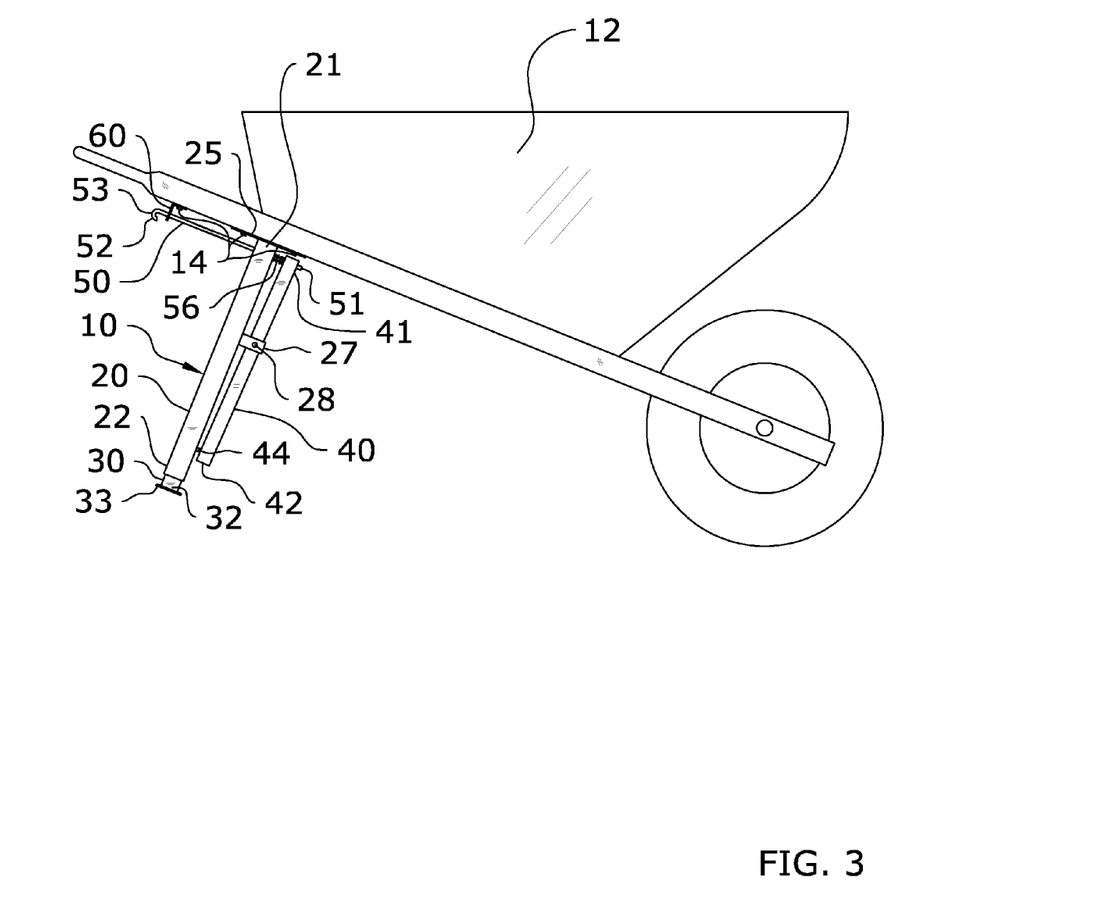
FIG. 3 is a side view of the present invention installed on a wheelbarrow.

The outer leg 20 includes an outer leg mount 25 positioned at its upper end 21 which acts as a securing point for securing the outer leg 20 to a wheelbarrow 12 such as shown in FIG. 3. The leg mount 25 is preferably comprised of a horizontal plate member which extends perpendicularly with respect to the outer leg 20 and which includes a pair of apertures 29 through which fasteners 14 may be extended to secure the outer leg 20 to the wheelbarrow 12.

The outer leg 20 itself generally includes at least a pair of apertures 29. The trigger 50 of the present invention will pass through a first aperture 29 positioned adjacent the upper end 21 of the outer leg 20 as shown in FIG. 3. A second aperture 29 is positioned adjacent to the lower end 22 of the outer leg 20 for receiving the locking member 40 as shown in FIG. 3. The positioning and numbering of these apertures 29 may vary for different embodiments of the present invention.

Figure 2:
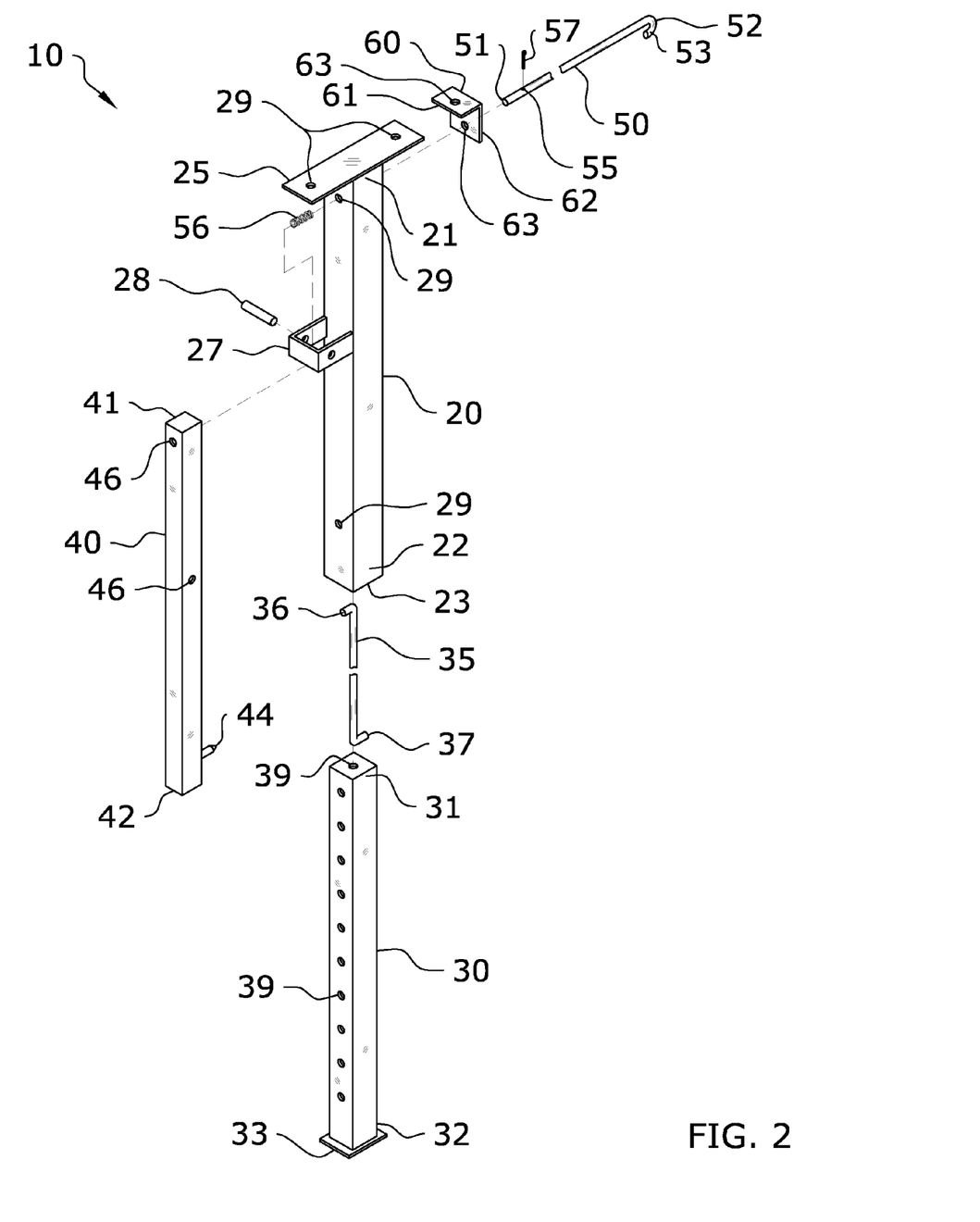
FIG. 2 is an exploded upper perspective view of the present invention.

The interior of the outer leg 20 also includes an aperture 39 through which the upper end 36 of the inner leg retainer 35 will extend and be secured as shown in FIG. 2. This aperture 39 is generally positioned within a cross-member which extends across the interior of the channel 24 of the outer leg 20 adjacent its upper end 21.

The outer leg 20 also includes a pivot retainer 27 extending from a central portion thereof. As shown in FIG. 2, the pivot retainer 27 is generally comprised of a bracket structure which extends outwardly from the outer leg 20. A pair of apertures 29 extend through the pivot retainer 27 for securing a pivot pin 28 therein. The pivot retainer 27 and pivot pin 28 act to allow the locking member 40 to pivot into and out of locking position in response to activation of the trigger 50.

C. Inner Leg

The present invention includes an inner leg 30 which is slidably positioned within the channel 24 of the outer leg 20. The inner leg 30 acts as an extender which may be utilized to level out a wheelbarrow 12 or other structure to which the present invention is secured. By sliding into and out of the outer leg 20, the inner leg 30 can easily vary the height of the present invention to suit specific needs and applications.

The inner leg 30 is generally comprised of an elongated member which is adapted to slide freely within the outer leg 20. Thus, the overall width of the inner leg 30 will be slightly less than that of the outer leg 20. The inner leg 30 includes an upper end 31 and a lower end 32, wherein the lower end 32 includes a base 33 for contacting the ground when the present invention is in use.

The inner leg 30 also includes a plurality of apertures 39 extending up its height as shown in FIG. 2. These apertures 39 are preferably positioned in a column configuration and act as anchoring points for the locking pin 44 of the locking member 40. Each of the apertures 39 of the inner leg 30 correspond to a different height when the locking pin 44 is engaged therein.

The inner leg 30 also includes an aperture 39 positioned at its upper end 31 as shown in FIG. 2 through which the inner leg retainer 35 will extend. The inner leg retainer 35 acts to ensure that the inner leg 30 never fully disengages from within the outer leg 20. The inner leg retainer 35 is generally comprised of an elongated member with a horizontal projection extending outwardly from each of its upper end 36 and lower end 37.

The upper end 36 of the inner leg retainer 35 extends through the internal aperture 29 of the outer leg 20 and the lower end 37 of the leg retainer 35 extends through the aperture 39 of the upper end 32 of the inner leg 30. The horizontal projection at each end 36, 37 acts to secure the inner leg 30 within the outer leg 20 when the locking member 40 is not engaged.

D. Locking Member

The present invention includes a locking member 40 which acts to engage with the inner leg 30 to retain a certain position within the outer leg 20 and disengage with the inner leg 30 to allow it to freely extend or retract within the outer leg 20. The locking member 40 is generally hollow through its length.

The locking member 40 is generally comprised of an elongated member having an upper end 41 and a lower end 42. The locking member 40 is pivotally positioned within the pivot retainer 27 with the pivot pin 28 extending through a centrally-located aperture 46 positioned at approximately the mid-point of the length of the locking member 40.

Figure 7:
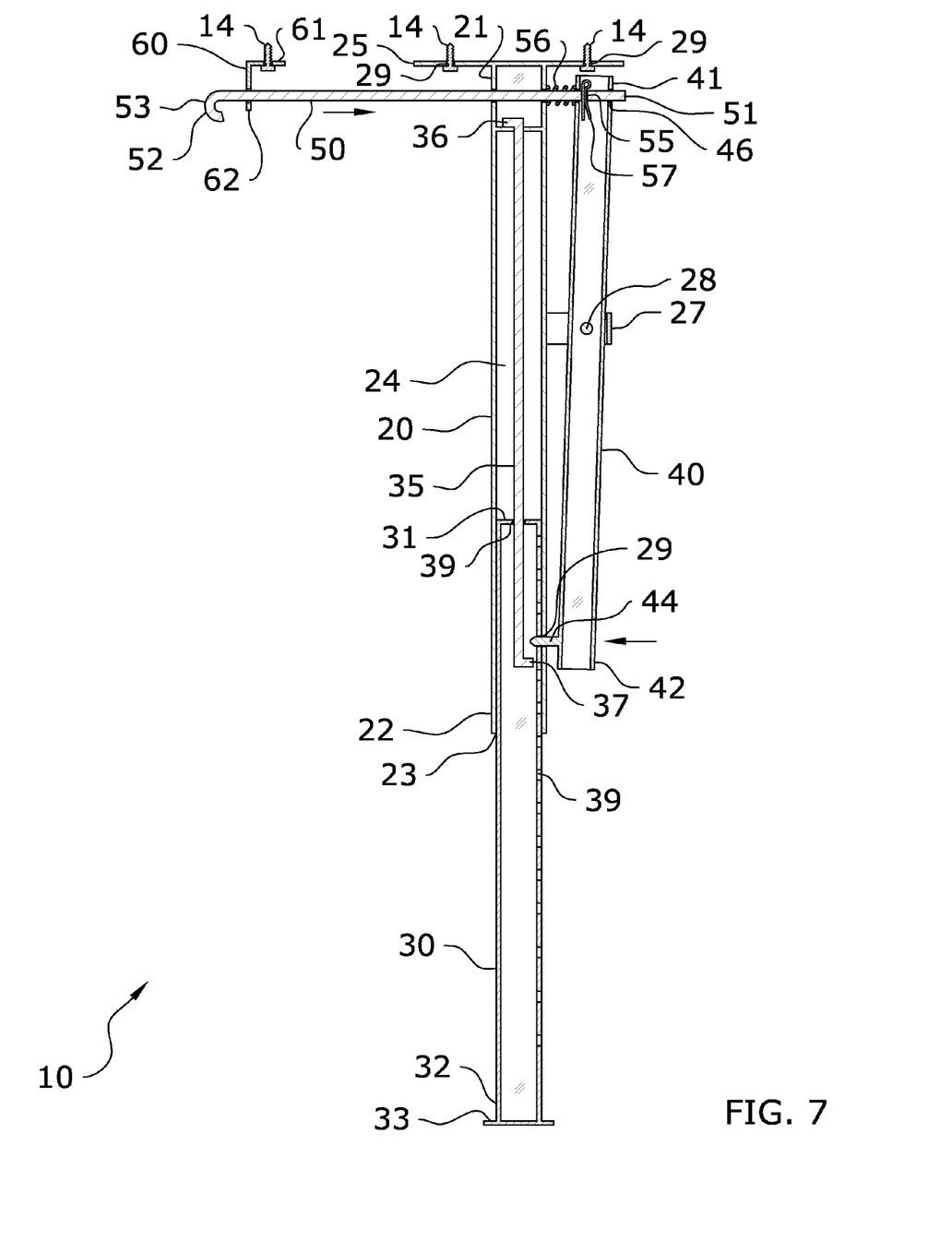
FIG. 7 is a side sectional view of the present invention locked in a second position.

The upper end 41 of the locking member 40 generally includes an aperture 46 through which the trigger 50 will extend. The stopper member 57 of the trigger 50 is positioned within the locking member 40 so as to allow the locking member 40 to pivot in response to activation of the trigger 50 as shown in FIG. 7.

Figure 5:
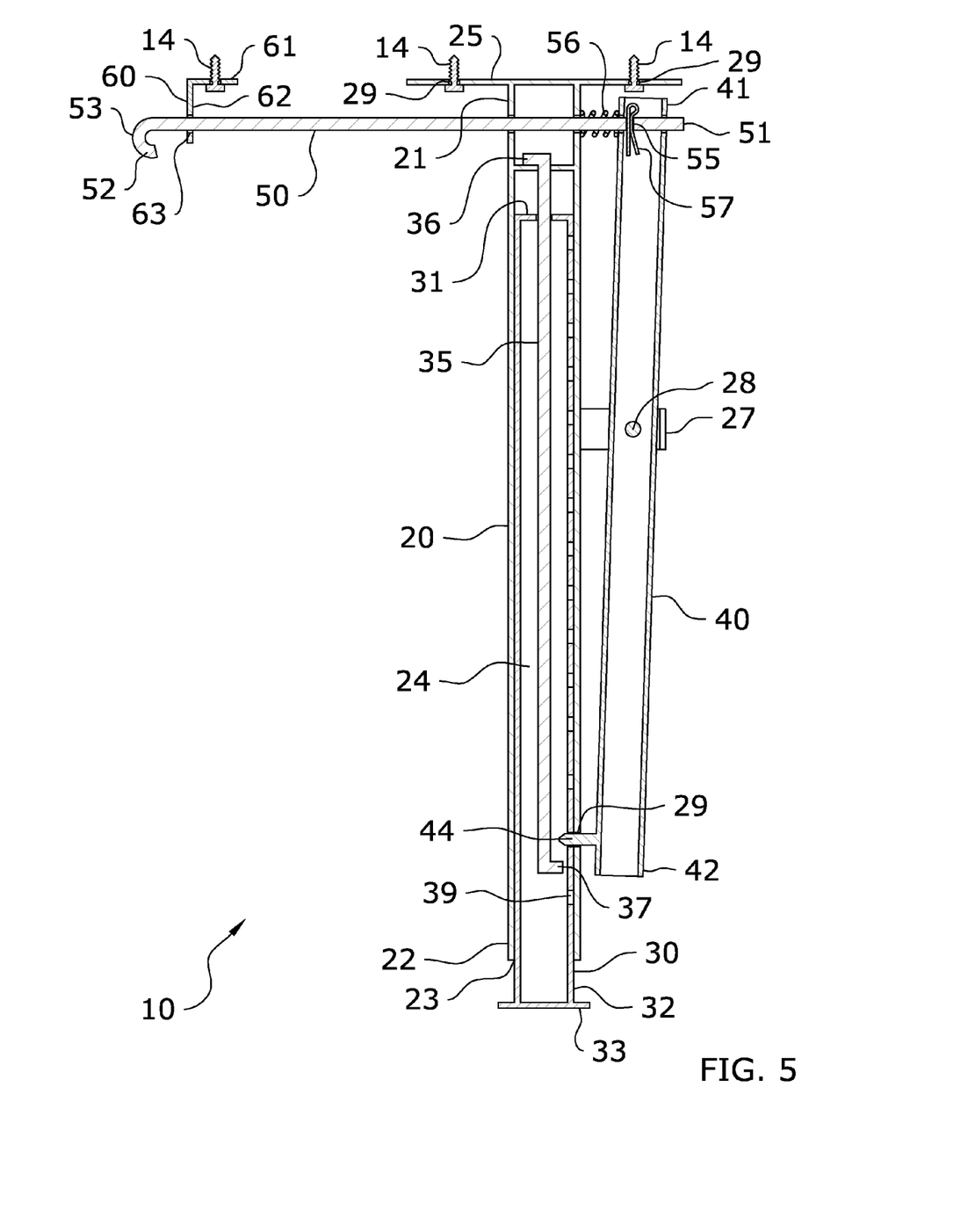
FIG. 5 is a side sectional view of the present invention locked in a first position.
Figure 6:
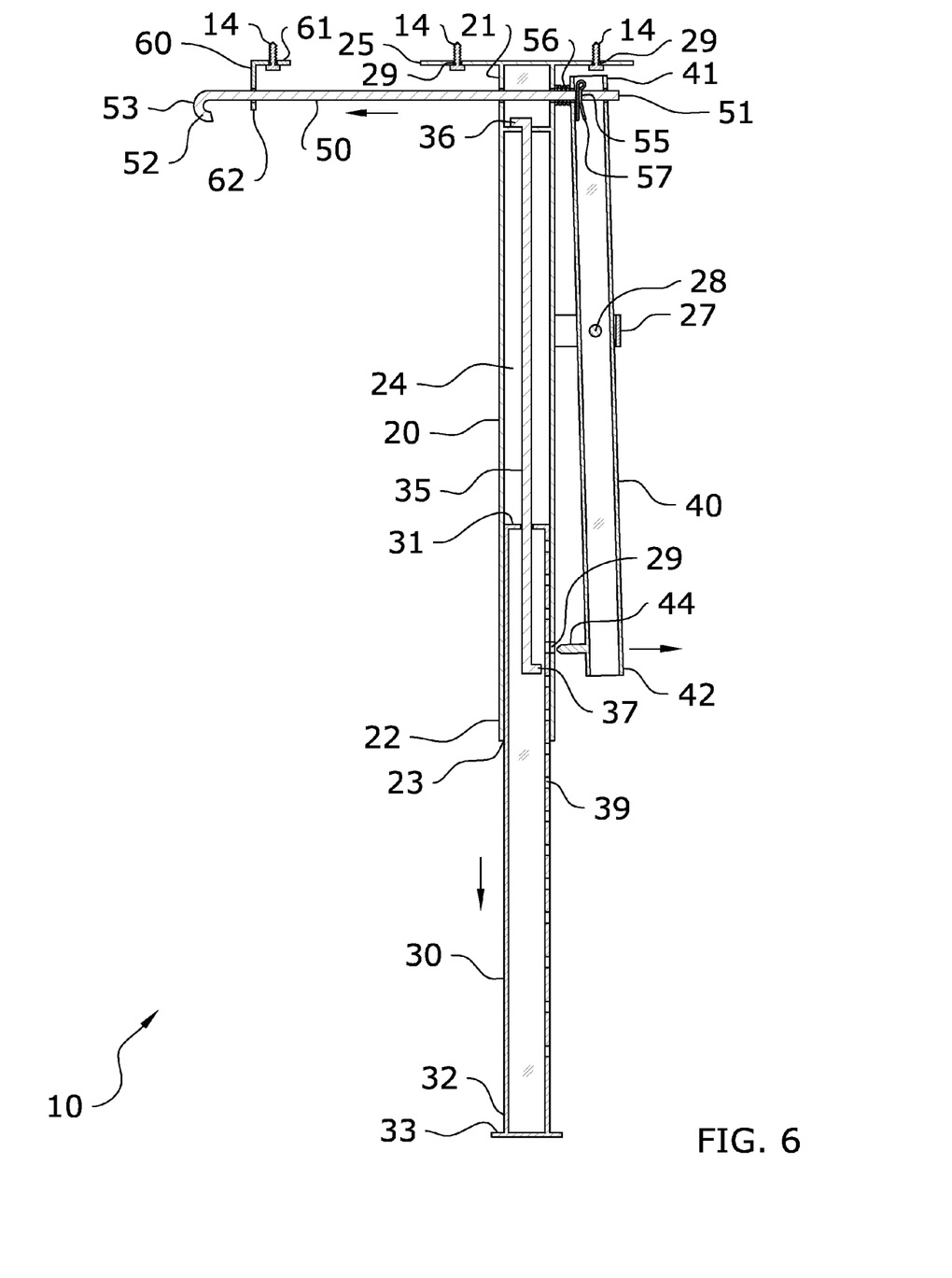
FIG. 6 is a side sectional view of the present invention with the locking pin disengaged.

A locking pin 44 extends outwardly from a point adjacent to the lower end 42 of the locking member 40 as shown in FIG. 2. The locking pin 44, when the locking member 40 is not pivoted outward, will extend into the aperture 29 of the outer leg 20 to engage with one of the multiple apertures 39 extending along the height of the inner leg 30 to engage with the inner leg 30 and lock it into a certain position within the outer leg 20 as shown in FIGS. 5, 6 and 7.

E. Trigger

The present invention includes a trigger 50 which is utilized to engage and disengage the locking pin 44 from the apertures 39 of the inner leg 30. The trigger 50 is comprised of an elongated member, such as a rod, which includes a first end 51 and a second end 52. The first end 51 of the trigger 50 extends through apertures 29, 46 in the outer leg 20 and locking member 40 as shown in FIG. 7. The second end 52 of the trigger 50 includes a finger grasp 53 comprised of a curled end 52 for grasping by a user when activating the trigger 50.

An aperture 55 extends through the trigger 50 for receiving a stopper member 57. The stopper member 57 is inserted through the aperture 55 at a position within the hollow locking member 40 to ensure that the trigger 50 is never fully removed from the locking member 40 as well as to provide the point of contact to impart force from the trigger 50 to pivot the locking member 40. A bias member 56 such as a spring encircles the trigger 50 between the outer leg 20 and the locking member 40 as shown in FIG. 7 so as to revert the trigger 50 absent application of force.

A trigger mount 60 is utilized to secure the trigger 60 in its horizontal position beneath a wheelbarrow 12. The trigger mount 60 is comprised of a bracket which includes a horizontal portion 61 and a vertical portion 62. Apertures 63 extend through both portions 61, 62. The aperture 63 on the horizontal portion 61 is utilized in combination with a fastener 14 to secure the trigger mount 60 to the underside of a wheelbarrow 12. The aperture 63 on the vertical portion 62 slidably receives the trigger 50 in a manner which allows the trigger 50 to freely traverse therethrough.

G. Operation of Preferred Embodiment

Figure 4:
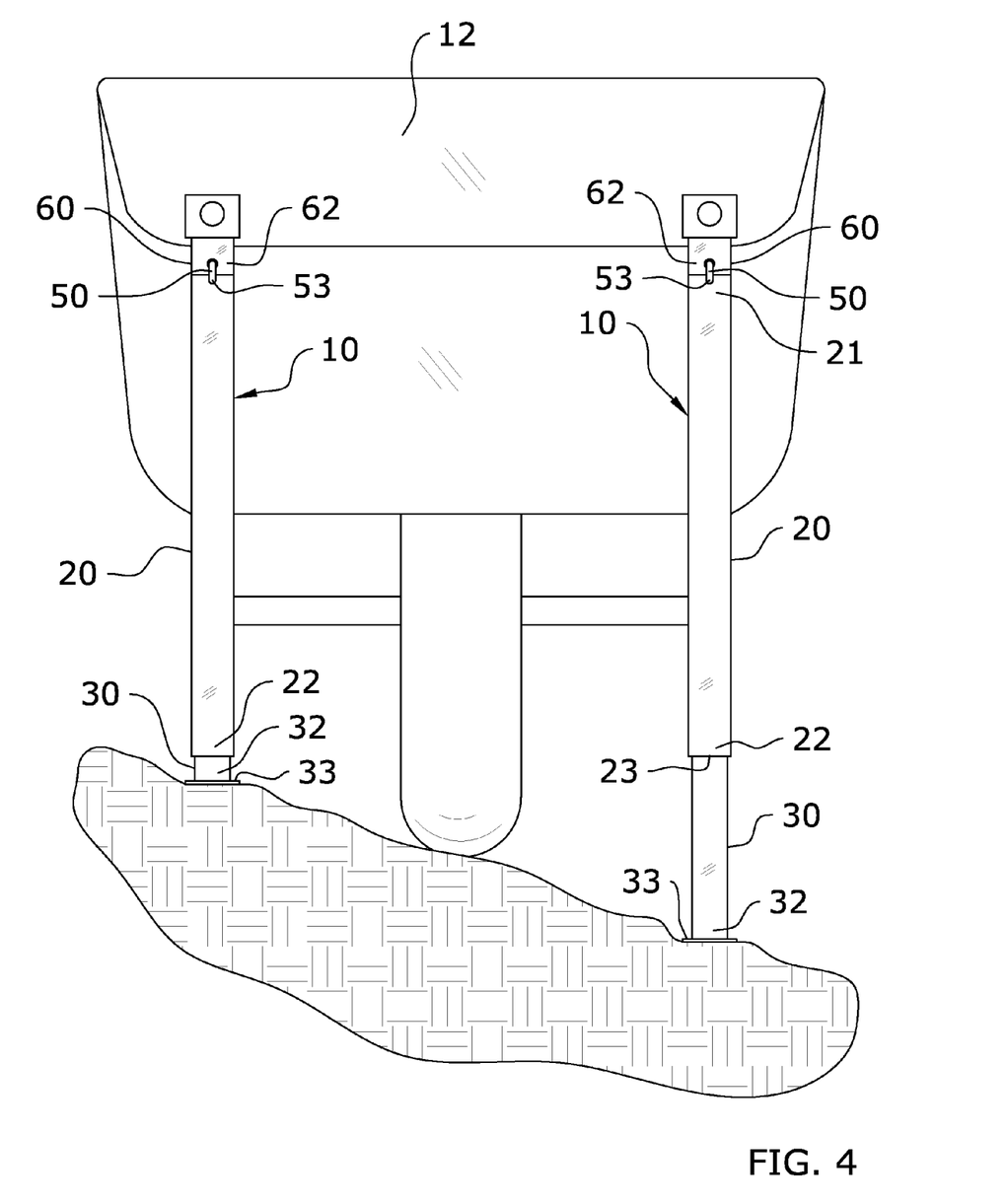
FIG. 4 is a rear view of the present invention in use on a wheelbarrow.

In use, the present invention is first secured to a wheelbarrow 12 by securing the outer leg mount 25 and the trigger mount 60 to the wheelbarrow 12 through use of fasteners 14 as shown in FIG. 3. Generally, two of the present invention will be utilized for a wheelbarrow 12 as shown in FIG. 4.

When the height of one or more of the legs 10 of the wheelbarrow 12 need to be adjusted, the trigger 50 is pulled out, which disengages the locking member 40 and allows the inner leg 30 to freely fall to the ground as shown in FIG. 6. When the inner leg 30 has extended to the proper length, the trigger 50 may be disengaged. The bias member 56 will cause the trigger 50 to revert to its resting position and cause the locking member 40 to pivot such that its locking pin 44 extends into one of the apertures 39 of the inner leg 30 corresponding with that length as shown in FIG. 7.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A leveling wheelbarrow leg, comprising:
an outer leg, said outer leg including an outer leg mount adapted to be secured to a wheelbarrow;
an inner leg slidably positioned within said outer leg, said inner leg including a plurality of apertures extending along a length of said inner leg;
a locking member pivotally secured alongside said outer leg, said locking member including a locking pin for engaging with one of said apertures of said inner leg; and
a trigger extending through said outer leg and secured to said locking member for pivoting said locking member, wherein said trigger includes a finger grasp.

2. The leveling wheelbarrow leg of claim 1, wherein said outer leg includes a pivot retainer, wherein said locking member is positioned within said pivot retainer.

3. The leveling wheelbarrow leg of claim 2, further comprising a pivot pin extending through said pivot retainer and said locking member.

4. The leveling wheelbarrow leg of claim 1, further comprising a bias member positioned around said trigger.

5. The leveling wheelbarrow leg of claim 1, further comprising a stopper member extending through said trigger.

6. The leveling wheelbarrow leg of claim 1, further comprising a trigger mount for securing said trigger to said wheelbarrow.

7. The leveling wheelbarrow leg of claim 1, further comprising an inner leg retainer linking said inner leg with said outer leg.

8. The leveling wheelbarrow leg of claim 1, wherein said inner leg includes a base positioned at a lower end of said inner leg.

9. A leveling wheelbarrow leg, comprising:
an outer leg, said outer leg including an outer leg mount adapted to be secured to a wheelbarrow, wherein said outer leg is hollow and includes a lower opening;
an inner leg slidably positioned within said outer leg, said inner leg including a plurality of apertures extending along a length of said inner leg;
an inner leg retainer linking said inner leg with said outer leg;
a locking member pivotally secured alongside said outer leg, said locking member including a locking pin for engaging with one of said apertures of said inner leg; and
a trigger extending through said outer leg and secured to said locking member for pivoting said locking member, wherein said outer leg includes a pivot retainer, wherein said locking member is positioned within said pivot retainer.

10. The leveling wheelbarrow leg of claim 9, further comprising a pivot pin extending through said pivot retainer and said locking member.

11. The leveling wheelbarrow leg of claim 9, wherein said trigger includes a finger grasp.

12. The leveling wheelbarrow leg of claim 9, further comprising a bias member positioned around said trigger.

13. The leveling wheelbarrow leg of claim 12, wherein said bias member is comprised of a spring.

14. The leveling wheelbarrow leg of claim 9, further comprising a stopper member extending through said trigger.

15. The leveling wheelbarrow leg of claim 9, further comprising a trigger mount for securing said trigger to said wheelbarrow.

16. The leveling wheelbarrow leg of claim 15, wherein said trigger mount is comprised of a horizontal portion and a vertical portion.

17. The leveling wheelbarrow leg of claim 9, wherein said inner leg includes a base positioned at a lower end of said inner leg.

18. A leveling wheelbarrow leg, comprising:
an outer leg, said outer leg including an outer leg mount adapted to be secured to a wheelbarrow;
an inner leg slidably positioned within said outer leg, said inner leg including a plurality of apertures extending along a length of said inner leg;
a locking member pivotally secured alongside said outer leg, said locking member including a locking pin for engaging with one of said apertures of said inner leg;
a trigger extending through said outer leg and secured to said locking member for pivoting said locking member; and
a bias member positioned around said trigger.

* * * * *